US009764385B2

(12) United States Patent
Yang et al.

(10) Patent No.: US 9,764,385 B2
(45) Date of Patent: Sep. 19, 2017

(54) POROUS ALUMINUM BODY AND MANUFACTURING METHOD THEREFOR

(71) Applicant: MITSUBISHI MATERIALS CORPORATION, Tokyo (JP)

(72) Inventors: Ji-Bin Yang, Kitamoto (JP); Koji Hoshino, Kitamoto (JP); Toshihiko Saiwai, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/655,516

(22) PCT Filed: Dec. 9, 2013

(86) PCT No.: PCT/JP2013/007233
§ 371 (c)(1),
(2) Date: Jun. 25, 2015

(87) PCT Pub. No.: WO2014/103202
PCT Pub. Date: Jul. 3, 2014

(65) Prior Publication Data
US 2015/0343532 A1 Dec. 3, 2015

(30) Foreign Application Priority Data

Dec. 27, 2012 (JP) .................. 2012-284678
Mar. 1, 2013 (JP) .................. 2013-040433

(51) Int. Cl.
*B23P 15/00* (2006.01)
*B22F 3/11* (2006.01)
(Continued)

(52) U.S. Cl.
CPC ............ *B22F 3/1103* (2013.01); *B22F 1/004* (2013.01); *B22F 1/0014* (2013.01); *B22F 3/002* (2013.01);
(Continued)

(58) Field of Classification Search
None
See application file for complete search history.

(56) References Cited

U.S. PATENT DOCUMENTS

| | | | | |
|---|---|---|---|---|
| 6,228,509 B1* | 5/2001 | Mizumoto | ............. | H05K 9/009 174/388 |
| 2012/0135142 A1* | 5/2012 | Yang | ................ | H01M 4/80 427/247 |
| 2013/0305673 A1* | 11/2013 | Zeller | ................ | B01D 39/2034 55/523 |

FOREIGN PATENT DOCUMENTS

| | | |
|---|---|---|
| JP | 62-067129 A | 3/1987 |
| JP | 03-110045 A | 5/1991 |

(Continued)

OTHER PUBLICATIONS

International Search Report mailed Mar. 11, 2014, issued for PCT/JP2013/007233.

(Continued)

*Primary Examiner* — Daniel J Schleis
(74) *Attorney, Agent, or Firm* — Locke Lord LLP

(57) ABSTRACT

A porous aluminum body having high porosity and a manufacturing method therefor are provided, wherein the porous aluminum body can be manufactured by continuous manufacturing steps. In the present invention, this porous aluminum body includes a plurality of aluminum fibers connected to each other. The aluminum fibers each have a plurality of columnar protrusions formed at intervals on an outer peripheral surface of the aluminum fibers, the columnar protrusions protruding outward from the outer peripheral surface. Adjacent aluminum fibers are integrated with the aluminum fibers and the columnar protrusions.

9 Claims, 7 Drawing Sheets

(51) Int. Cl.

| | | |
|---|---|---|
| *B22F 1/00* | (2006.01) | |
| *C22C 1/08* | (2006.01) | |
| *C22C 21/00* | (2006.01) | |
| *B22F 3/00* | (2006.01) | |
| *C22C 1/04* | (2006.01) | |
| *H01M 4/66* | (2006.01) | |
| *H01M 4/80* | (2006.01) | |
| *H01G 11/70* | (2013.01) | |
| *C22C 47/14* | (2006.01) | |
| *C22C 49/14* | (2006.01) | |
| *H01M 10/0525* | (2010.01) | |
| *H01G 9/045* | (2006.01) | |

(52) U.S. Cl.
CPC ............. *C22C 1/0416* (2013.01); *C22C 1/08* (2013.01); *C22C 21/00* (2013.01); *H01G 11/70* (2013.01); *H01M 4/661* (2013.01); *H01M 4/806* (2013.01); *C22C 47/14* (2013.01); *C22C 49/14* (2013.01); *H01G 9/045* (2013.01); *H01M 10/0525* (2013.01); *Y02E 60/13* (2013.01); *Y10T 428/12424* (2015.01)

(56) References Cited

FOREIGN PATENT DOCUMENTS

| | | |
|---|---|---|
| JP | 11-220282 A | 8/1999 |
| JP | 2004-018951 A | 1/2004 |
| JP | 2008-020864 A | 1/2008 |
| JP | 2009-256788 A | 11/2009 |
| JP | 2010-280951 A | 12/2010 |

OTHER PUBLICATIONS

Notice of Rejection mailed Sep. 9, 2014, issued for the Japanese patent application No. 2013-040433 and English translation thereof.
Written Opinion mailed Mar. 11, 2014, issued for PCT/JP2013/007233.

* cited by examiner

POROUS ALUMINUM BODY AND MANUFACTURING METHOD THEREFOR

TECHNICAL FIELD

The present invention relates to a porous aluminum body including a large number of aluminum fibers and a manufacturing method therefor.

BACKGROUND ART

For example, many porous bodies made of aluminum are proposed as an electrode collector of an electric double-layer capacitor or a lithium ion battery, a filter for recovering hydrogen in a fuel cell, a refrigerant passage of a heat pipe for heat exchange, or a regenerator of a Stirling engine mechanism.

Conventionally, as such a porous aluminum body, a porous body obtained by forming an aluminum foil and a porous body having a skeleton obtained by sintering aluminum powder as observed in the following Patent Literature 1 are known.

However, there has been a problem that when a porous body is formed of these aluminum foil and aluminum powder, it is difficult to obtain a porous body having high porosity. On the other hand, the improvement in a porous body has been demanded because, in the above capacitor or lithium ion battery, better characteristics can be obtained as the open porosity of an electrode collector is increased, and similarly because, also as a refrigerant passage of a heat exchanger, the heat exchange efficiency is increased as the open porosity of the porous body is increased.

Therefore, the present inventors have proposed, in the following Patent Literature 2, a method for manufacturing an aluminum porous body having a three-dimensional network skeleton structure by forming a viscous composition using a mixed raw material powder obtained by mixing aluminum powder and a sintering aid powder containing titanium and the like, foaming the formed composition, and then sintering the foam by heating in a non-oxidizing atmosphere. According to this manufacturing method, an aluminum porous body having a high porosity of 70 to 90% can be obtained.

However, in the above method for manufacturing an aluminum porous body, there has been a problem that since a predetermined holding time is required particularly in the step of foaming a viscous composition, it is necessary to employ a so-called batch treatment, and it is difficult to perform continuous and highly efficient manufacturing as a whole.

CITATION LIST

Patent Literature

Patent Literature 1: Japanese Patent Laid-Open No. 2009-256788
Patent Literature 2: Japanese Patent Laid-Open No. 2010-280951

SUMMARY OF INVENTION

Technical Problem

The present invention has been made in light of the above-described circumstances, and it is an object of the present invention to provide a porous aluminum body having high porosity and a manufacturing method therefor, wherein the porous aluminum body can be manufactured by continuous and highly efficient manufacturing steps.

Solution to Problem

In order to achieve the above object, the porous aluminum body according to claim 1 is a porous aluminum body including a plurality of sintered aluminum fibers, wherein the aluminum fibers each have a plurality of columnar protrusions protruding outward from an outer peripheral surface of the aluminum fibers and are integrated with the aluminum fibers and the columnar protrusions.

Further, in the invention according to claim 2, the columnar protrusions each contain a compound including titanium and aluminum at a tip part thereof in the invention according to claim 1.

Next, the method for manufacturing a porous aluminum body according to claim 3 comprises adhering titanium powder and/or titanium hydride powder to an outer peripheral surface of aluminum fibers to obtain a mixture and sintering the mixture at a temperature in the range of 655° C. to 665° C. in an inert gas atmosphere.

Further, in the invention according to claim 4, the titanium powder and/or titanium hydride powder has a particle size of 1 to 50 μm and is added in an amount of 0.5 to 20 to 100 of the aluminum fibers in terms of the weight ratio in the invention according to claim 3.

Furthermore, in the invention according to claim 5, the titanium powder and/or titanium hydride powder is previously added to the aluminum fibers followed by mixing to obtain a mixture; the mixture is then spread on a carbon sole plate or in a carbon container in a predetermined shape: and then the spread mixture is subjected to the sintering in the invention according to claim 3 or 4.

Advantageous Effects of Invention

According to the porous aluminum body according to claim 1 or 2 and the method for manufacturing a porous aluminum body according to any one of claims 3 to 5, a porous aluminum body having a porosity of 70% or more can be manufactured continuously and relatively inexpensively.

DESCRIPTION OF EMBODIMENTS (First Embodiment)

Figure 1:
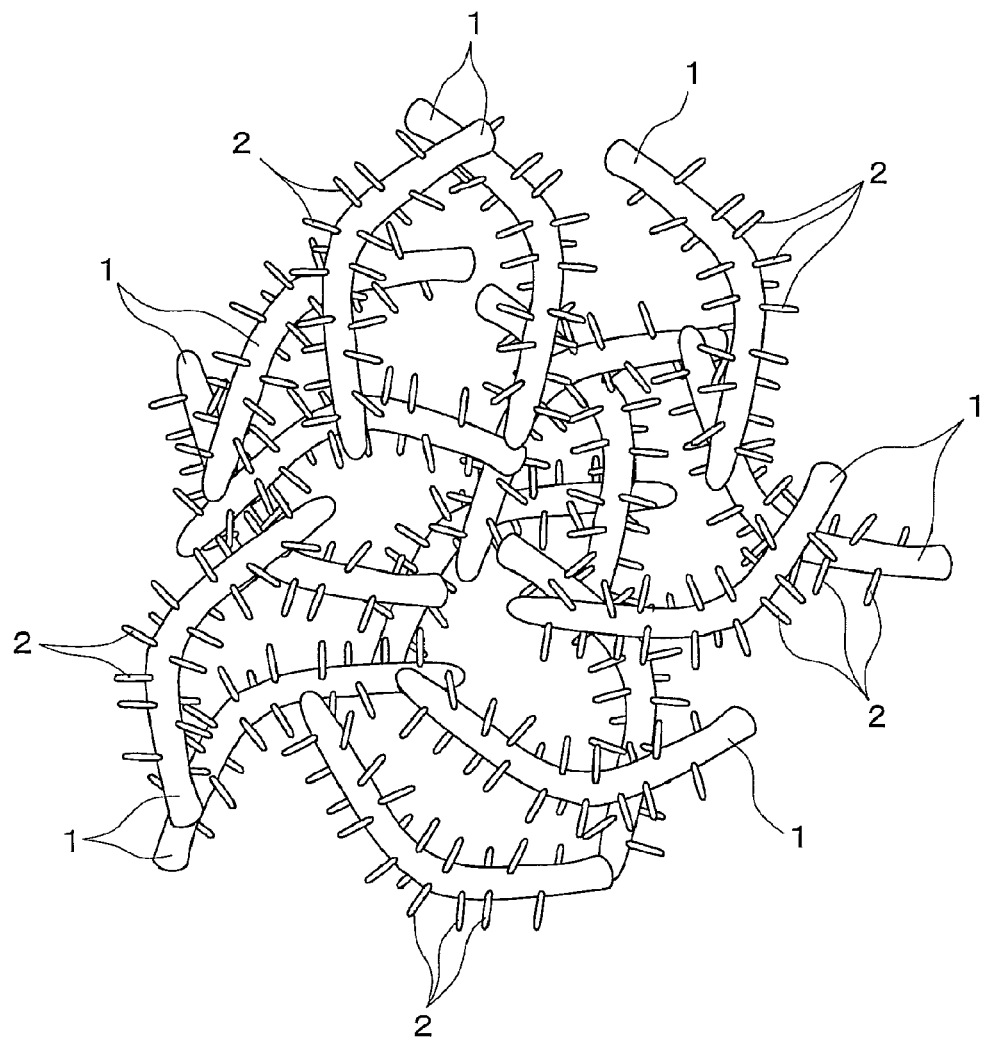
FIG. 1 is a schematic diagram illustrating an example of the porous aluminum body of the present invention.
Figure 2:
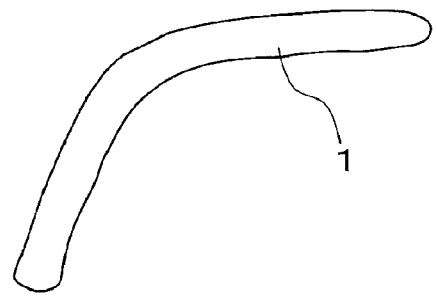
FIG. 2 is a schematic diagram illustrating an aluminum fiber serving as a raw material of the porous aluminum body of FIG. 1.

FIG. 1 to FIG. 4 illustrate a first embodiment of the porous aluminum body of the present invention.

A plurality of aluminum fibers 1 are mutually connected and integrated and formed into a plate shape, thus obtaining the porous aluminum body. Here, the aluminum fibers 1 each have an average wire diameter of 40 to 300 μm (preferably 50 to 100 μm) and a length of 0.2 to 20 mm (preferably 1 to 10 mm).

Here, the aluminum fibers 1 each have, on an outer peripheral surface thereof, a plurality of columnar protrusions 2 protruding outward from the outer peripheral surface. These columnar protrusions 2 are formed at intervals in 5 to 100 places per 100 μm in length of the aluminum fibers. Further, the columnar protrusions 2 each have a smaller diameter than the aluminum fibers 1 and a length protruding outward from the outer peripheral surface of 1 to 500 μm.

Further, at least the tip part of each columnar protrusion 2 is formed of a compound including titanium and aluminum which has a higher melting point than that of the aluminum fiber 1 itself.

Then, the aluminum fibers 1 themselves and the columnar protrusions 2 of the adjacent aluminum fibers 1 are mutually joined and integrated to form the porous aluminum body.

Next, a method for manufacturing the porous aluminum body having the above configuration will be described.

First, at ordinary temperatures, titanium powder, titanium hydride powder, or a mixed powder thereof each having an average particle size of 1 to 50 μm (preferably 5 to 30 μm) (hereinafter generically referred to as titanium powder 3) is added to a large number of aluminum fibers 1 having an average wire diameter of 40 to 300 μm (preferably 50 to 200 μm) and a length of 0.2 to 20 mm (preferably 1 to 10 mm) followed by mixing these components to obtain premixed fibers (raw material premixing step).

Figure 3:
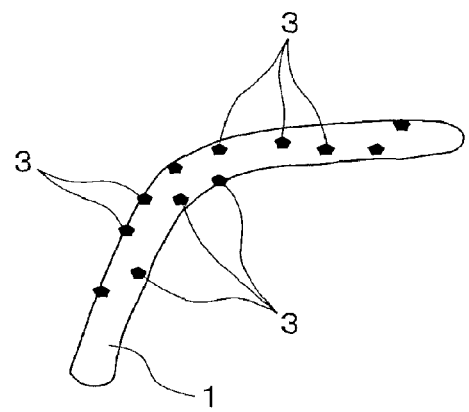
FIG. 3 is a schematic diagram illustrating the state where titanium or titanium hydride powder has adhered to the outer peripheral surface of the aluminum fiber of FIG. 2.

At this time, the titanium powder 3 in an amount of 0.5 to 20 is added to 100 of the aluminum fibers in terms of the weight ratio. Then, the aluminum fibers 1 and the titanium powder 3 are mixed while allowed to flow using mixing equipment such as an automatic mortar, a pan type oscillating granulator, and a shaker mixer. Thereby, the titanium powder 3 is uniformly scattered and adhered to the outer peripheral surface of the aluminum fibers 1 at intervals of 5 to 100 μm, as illustrated in FIG. 3.

Next, an organic binder solution is sprayed on and mixed with the premixed fibers and dried at 40° C. or less. The organic binder used here is desirably a binder which is burned, decomposed and vaporized at 500° C. or less in the air, and does not contain residual carbon. Examples of suitable organic binders include an acrylic resin and a cellulose type polymer.

Further, examples of a solvent which can be used include a water-based solvent, an alcohol-based solvent, and an organic solvent system other than the alcohol-based solvent. However, when a water-based solvent is used, the drying temperature is desirably 40° C. or less as described above because the aluminum fibers 1 are rapidly oxidized at a temperature of more than 50° C. in the presence of water.

Next, the premixed fiber raw material produced in the above steps is quantitatively supplied to an oscillating conveyor at a predetermined filling speed. Then, the premixed fibers spread in the width direction of the oscillating conveyor while moving in the traveling direction on the oscillating conveyor and are leveled to a thickness variation of ±10% or less. Next, the premixed fibers on the oscillating conveyor are transferred to a carbon sole plate placed on the belt conveyor of a sintering furnace. At this time, since the belt conveyor of the sintering furnace moves at a constant speed, the premixed fibers are continuously transferred to the carbon sole plate with an almost uniform thickness having a thickness variation of ±10% or less.

Note that by transferring the premixed fibers to the carbon sole plate, the aluminum fibers can be prevented from adhering in the latter sintering step. Incidentally, examples of the carbon sole plate to be used include a hard plate and a flexible sheet.

Further, the thickness of the premixed fiber raw material on the carbon sole plate is preferably larger than the thickness of the designated product by 1 to 10%, desirably 2 to 50, so that after passing through the latter sintering step, the raw material is rolled and formed to a predetermined thickness and bulk density of the product. Note that a proper value of bulk density is different depending on the applications of the product and the like, and when the product is an electrode collector of an electric double-layer capacitor or a lithium ion battery, the product is preferably formed to have a bulk density in the range of 0.2 to 0.6 g/cm$^3$.

Next, the premixed fiber raw material on the carbon sole plate is conveyed to the sintering furnace by the belt conveyor and first held in a temperature range of 350 to 500° C. for 0.5 to 5 minutes, thus performing debinding treatment. Then, the resulting fiber raw material is subjected to the sintering process by holding it in a temperature range of 655 to 665° C. for 0.5 to 60 minutes (preferably for 1 to 20 minutes) in an argon gas atmosphere at a dew point of −50° C. or less (preferably −65° C. or less) (sintering step). Thereby, a porous aluminum body in which a large number of aluminum fibers 1 are connected is formed.

The production process of the porous aluminum body in this sintering step will be described in detail. First, before the sintering step, the aluminum fibers 1 are in the state of being covered with an oxide formed on the outer peripheral surface thereof. Then, the inner pressure is increased by melting the aluminum as the temperature increases to a temperature range of 655 to 665° C. in this sintering step.

Figure 4:
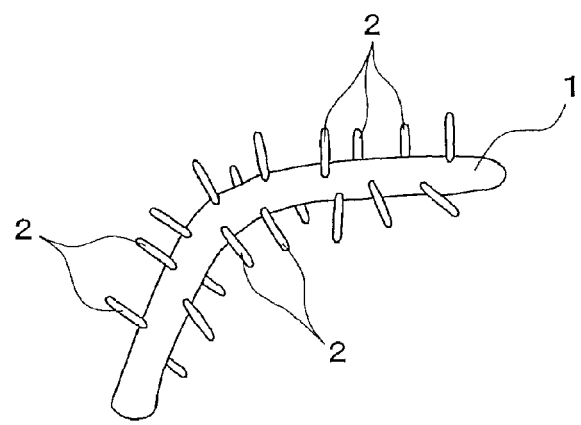
FIG. 4 is a schematic diagram illustrating the state where the columnar protrusions are formed on the outer peripheral surface of the aluminum fiber of FIG. 3.

On the other hand, at the above sintering temperature, the titanium powder 3 adhered to the outer peripheral surface of the aluminum fibers 1 is reacted with the aluminum oxide at the adhered point, and the internal molten aluminum is blown outward through breakage of the aluminum oxide film. Then, the blown molten aluminum reacts with titanium to form a compound having a higher melting point, and the compound is solidified to form columnar protrusions 2 as illustrated in FIG. 4. Further, the columnar protrusions 2 are integrated in a molten state with other columnar protrusions 2 on adjacent aluminum fibers 1 or subjected to solid phase sintering with each other to connect the aluminum fibers 1. Thus, a porous aluminum body as illustrated in FIG. 1 as a whole is formed. Note that examples of the compound produced by the reaction between aluminum and titanium include $Al_3Ti$.

Therefore, according to the method for manufacturing a porous aluminum body as described above, a porous aluminum body having a porosity of 70% or more can be manufactured continuously and relatively inexpensively.

Note that in the above first embodiment, a sintered body sheet was manufactured using only the aluminum fiber 1, but a mixture of the aluminum fiber 1 and aluminum powder can also be used. For example, aluminum powder having an average particle size of 20 to 300 μm can be used. Further, the aluminum powder can be mixed with the aluminum fiber in an amount of 20 to 50 mass % in terms of the mass ratio of the aluminum powder to the total amount of the aluminum fiber and the aluminum powder.

Thus, by suitably mixing the aluminum powder, the porosity of a porous aluminum body can be adjusted, or the mechanical strength of the porous aluminum body can be improved.

(Second Embodiment)

Figure 5A:
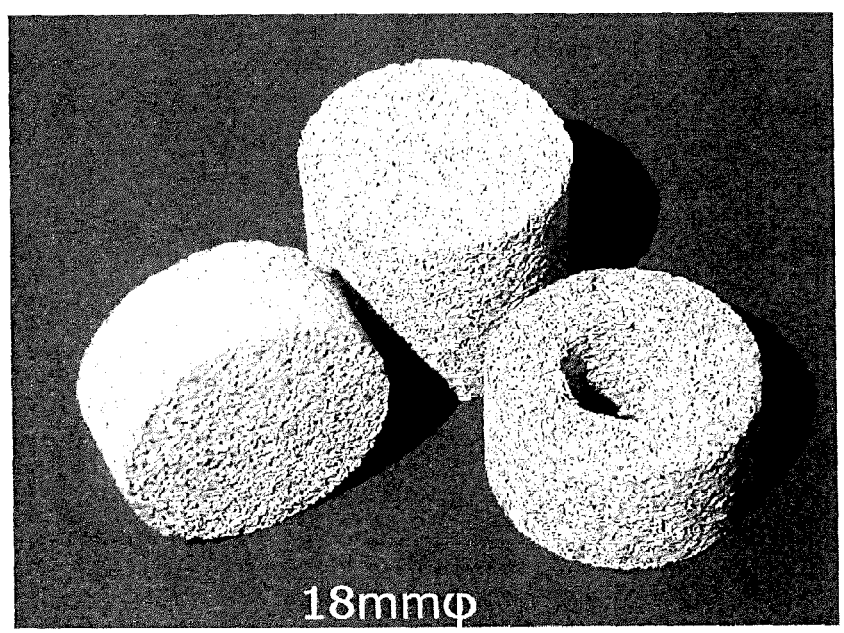
FIG. 5A is an outline view illustrating a second embodiment of the porous aluminum body of the present invention.
Figure 5B:
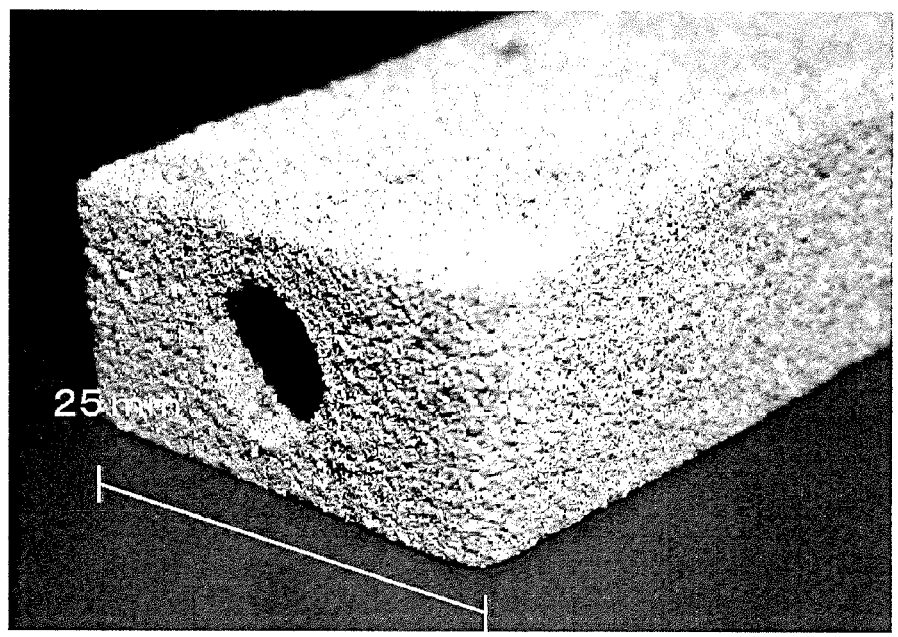
FIG. 5B is an outline view illustrating a second embodiment of the porous aluminum body of the present invention.
Figure 5C:
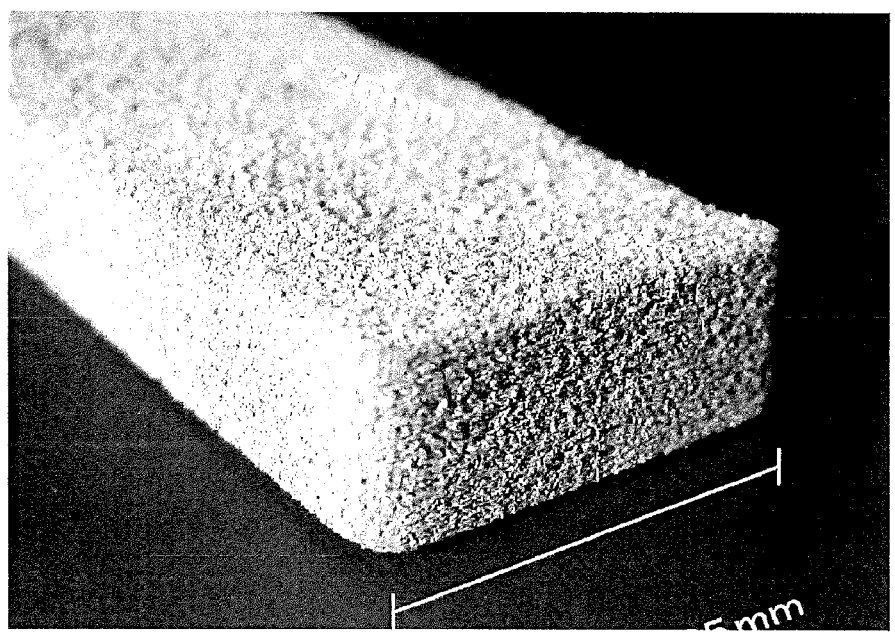
FIG. 5C is an outline view illustrating a second embodiment of the porous aluminum body of the present invention.
Figure 6:
FIG. 6 is a microscope photograph of a porous aluminum body manufactured by an example of the present invention.
Figure 7:
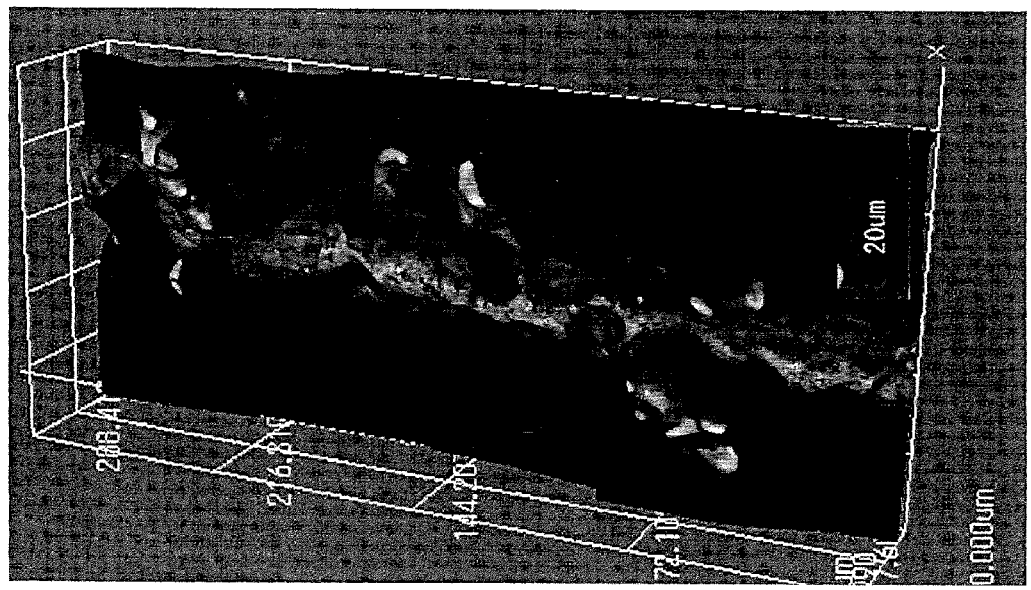
FIG. 7 is an enlarged photograph of an aluminum fiber part of FIG. 6.
Figure 7:
Figure 8:
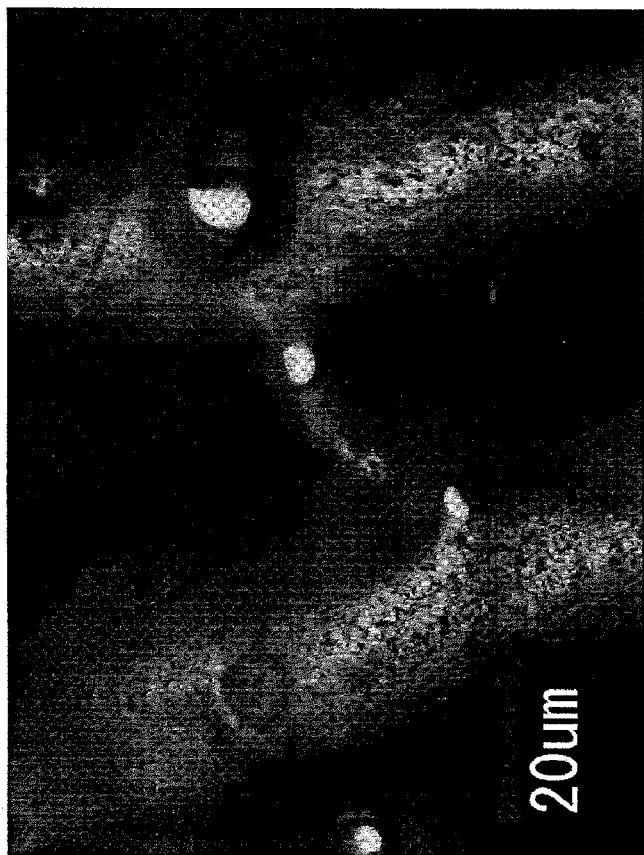
FIG. 8 is an enlarged photograph of another aluminum fiber part of FIG. 6.
Figure 8:
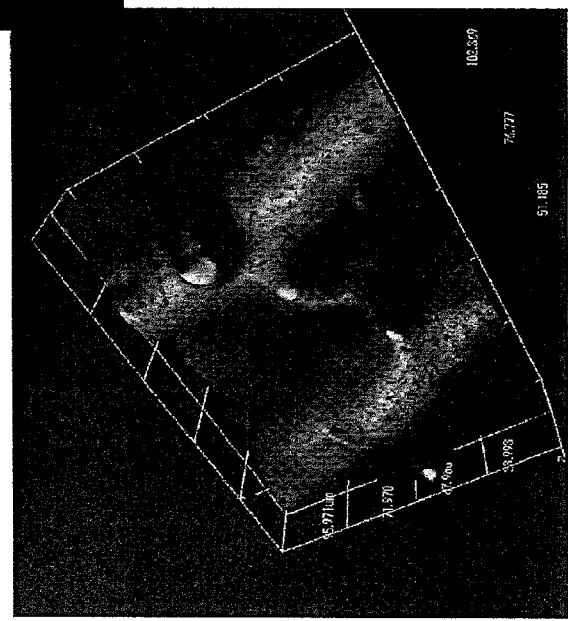
Figure 9:
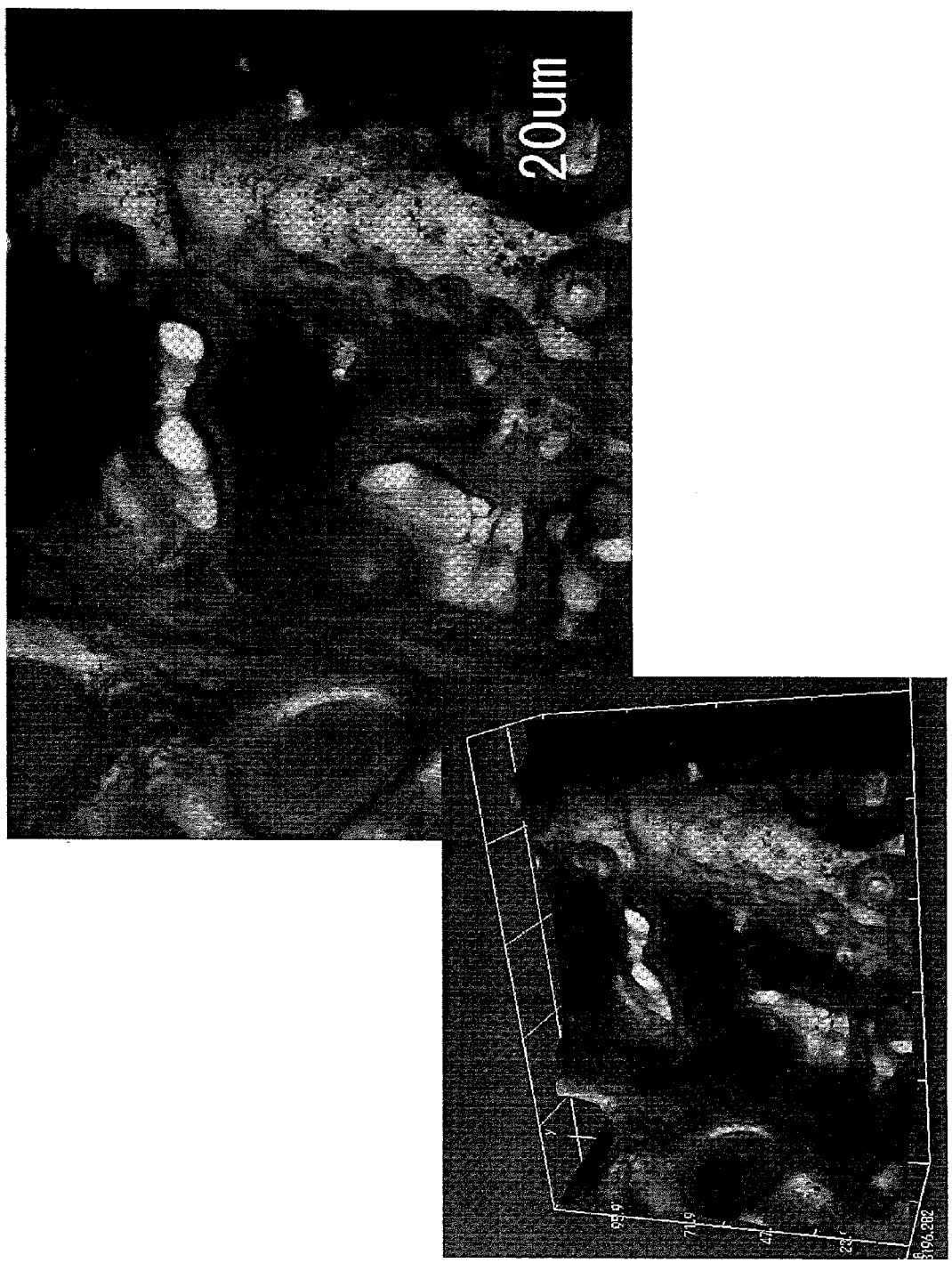
FIG. 9 is an enlarged photograph of another aluminum fiber part of FIG. 6.

FIG. 5A to FIG. 5C illustrate a second embodiment of the porous aluminum body according to the present invention.

This porous aluminum body is different from that shown in the first embodiment in that, although a plurality of aluminum fibers 1 are mutually connected and integrated in the same manner as shown in the first embodiment, the porous aluminum body is formed into a, bulk shape such as a columnar shape, a cylindrical shape, and a rectangular plate shape.

Here, a method for manufacturing the above porous aluminum body will be described. Also in this manufacturing method, titanium powder, titanium hydride powder, or a mixed powder thereof each having an average particle size of 1 to 50 μm (preferably 5 to 30 μm) (hereinafter generically referred to as titanium powder 3) is added to a large number of aluminum fibers 1 having an average wire diameter of 40 to 300 μm(preferably 50 to 200 μm) and a length of 0.2 to 20 mm (preferably 1 to 10 mm) followed by mixing these components to obtain premixed fibers (raw material premixing step). The raw material premix step is the same as that shown in the first embodiment.

However, in this manufacturing method, the premixed fiber raw material produced in the above step is quantitatively supplied, for example, to a carbon mold (having an opening of 200 mm×200 mm and a depth of 20 mm in FIG. 5C) which defines a product form illustrated in FIG. 5A to FIG. 5C at a predetermined filling speed to bulk-fill the mold. At this time, when a porous aluminum body having a hole or a through hole as illustrated in FIG. 5A and FIG. 5B is manufactured, a core for forming the hole or through hole is previously arranged in a predetermined position in a carbon mold.

Next, the carbon mold is conveyed to the sintering furnace, and the fiber raw material is first held in a temperature range of 350 to 500° C. for 0.5 to 5 minutes, thus performing debinding treatment. Then, the resulting fiber raw material is subjected to the sintering process by holding it in a temperature range of 655 to 665° C. for 0.5 to 60 minutes (preferably for 1 to 20 minutes) in an argon gas atmosphere at a dew point of −50° C. or less (preferably −65° C. or less) (sintering step). Thereby, a porous aluminum body having a shape as illustrated in FIG. 5A to FIG. 5C in which a large number of aluminum fibers 1 are connected is formed. According to the method for manufacturing a porous aluminum body as described above, a porous aluminum body having a porosity of 70% or more and a pore size of 300 to 600 μm is obtained.

EXAMPLES

A porous aluminum body was manufactured by the Method for manufacturing a porous aluminum body shown in the first embodiment.

First, 5% by weight of titanium hydride (TiH$_2$) having an average particle size of 10 μm was added to aluminum fibers having an average wire diameter of 50 μm to prepare premixed fibers, and then the premixed fibers are wet-blended with a cellulose binder followed by drying to obtain a product, which was used as premixed fibers.

Then, the premixed fibers were uniformly spread on a carbon sole plate to obtain a filled layer having a thickness of about 1 mm in the state of bulk-filling. Next, the premixed fibers on the carbon sole plate were sintered at 658° C. for 10 minutes in an argon gas atmosphere at a dew point of −65° C. or less to prepare a porous aluminum body.

FIG. 6 to FIG. 9 are each a microscope photograph of a porous aluminum body manufactured in this way.

These photographs reveal that the resulting porous aluminum body comprises a large number of aluminum fibers having an average wire diameter of 50 μm and a plurality of columnar protrusions formed at intervals on an outer peripheral surface of the aluminum fibers, the columnar protrusions having a short length protruding outward from the outer peripheral surface, wherein adjacent aluminum fibers are connected to each other at the columnar protrusions and integrated.

INDUSTRIAL APPLICABILITY

A porous aluminum body having high porosity and a manufacturing method therefor can be provided, wherein the porous aluminum body can be manufactured by continuous manufacturing steps.

REFERENCE SIGNS LIST

1 Aluminum fiber
2 Columnar protrusion
3 Titanium powder

The invention claimed is:

1. A porous aluminum body comprising a plurality of sintered aluminum fibers, wherein the aluminum fibers each have a plurality of columnar protrusions protruding outward from an outer peripheral surface of the aluminum fibers and are integrated with the aluminum fibers and the columnar protrusions,
   wherein the aluminum fibers each have a wire diameter of 40 to 300 μm and the columnar protrusions each have a smaller diameter than the aluminum fibers.

2. The porous aluminum body according to claim 1, wherein the columnar protrusions each comprise a compound comprising titanium and aluminum at a tip part thereof.

3. The porous aluminum body of claim 1, wherein the columnar protrusions are formed at intervals in 5 to 100 places per 100 μm in length of the aluminum fibers.

4. The porous aluminum body of claim 1, wherein the columnar protrusions each have a diameter of 1 to 50 μm.

5. The porous aluminum body of claim 4, wherein the columnar protrusions having a length of 1 to 500 μm protruding outward from the outer peripheral surface of the aluminum fibers.

6. The porous aluminum body according to claim 3, wherein the columnar protrusions each comprise a compound comprising titanium and aluminum at a tip part thereof.

7. The porous aluminum body according to claim 1, wherein the columnar protrusions is formed through the reaction between titanium powder and the aluminum fiber.

8. A porous aluminum body comprising a plurality of sintered aluminum fibers, wherein the aluminum fibers each have a plurality of columnar protrusions protruding outward from an outer peripheral surface of the aluminum fibers and are integrated with the aluminum fibers and the columnar protrusions,
- wherein the aluminum fibers each have a wire diameter of 50 to 300 μm and the surface of the aluminum fiber is oxidized; and
- the columnar protrusions each have a smaller diameter than the aluminum fibers; and the columnar protrusions comprising $Al_3Ti$.

9. The porous aluminum body according to claim 8, wherein the columnar protrusions is formed through the reaction between titanium powder and the aluminum fiber.

* * * * *